H. WRIGHT.
Mold for Bottle-Stopper Cage.
No. 208,662. Patented Oct. 1. 1878.
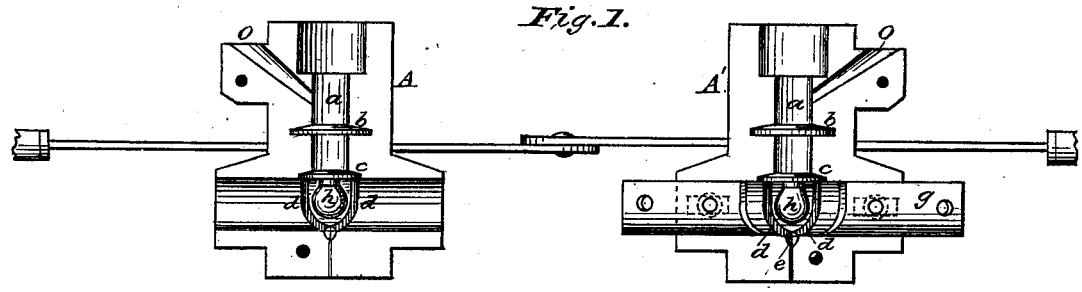
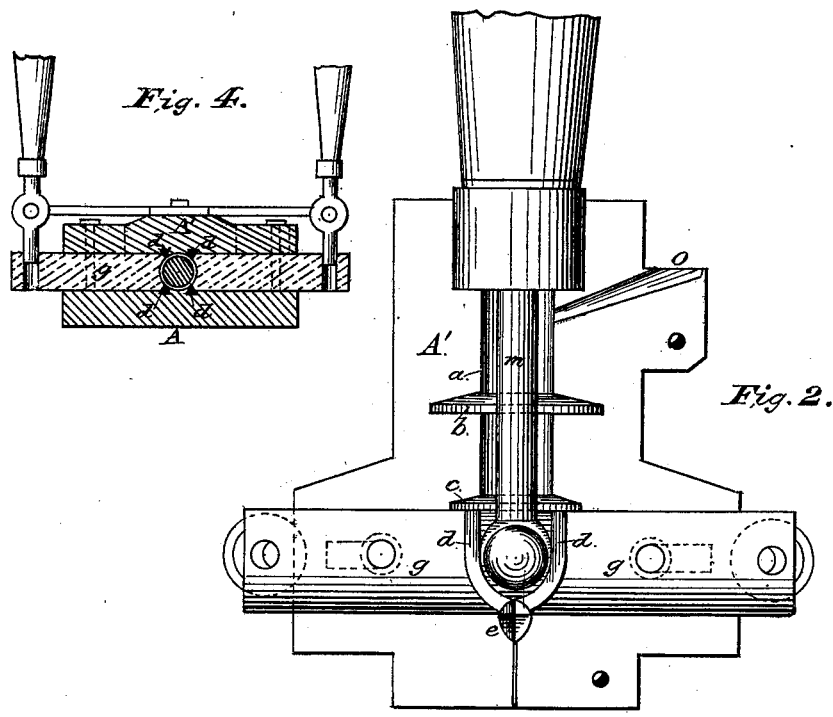
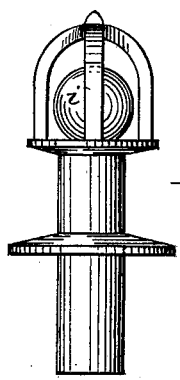
Witnesses:
L. C. Fitler
J. W. Bakewell.
Inventor:
Homer Wright
by Bakewell & Kerr
Attorneys.

UNITED STATES PATENT OFFICE.

HOMER WRIGHT, OF PITTSBURG, PENNSYLVANIA.

IMPROVEMENT IN MOLDS FOR BOTTLE-STOPPER CAGES.

Specification forming part of Letters Patent No. 208,662, dated October 1, 1878; application filed September 6, 1878.

*To all whom it may concern:*

Be it known that I, HOMER WRIGHT, of the city of Pittsburg, in the county of Allegheny and State of Pennsylvania, have invented a new and useful Improvement in Molds for Casting Bottle-Stoppers; and I do hereby declare the following to be a full, clear, and exact description thereof, reference being had to the accompanying drawings, forming part of this specification, in which—

Figure 1 is an open view of molds embodying my invention. Fig. 2 is a central section, the parts being in position for casting. Fig. 3 is a view of the article cast, and Fig. 4 is a horizontal section.

Like letters refer to like parts wherever they occur.

My invention relates to the construction of molds for casting that class of metallic bottle-stoppers wherein a ball inclosed by a cage is employed for temporarily closing the opening or neck of a bottle, and for similar articles; and consists in combining with a mold and mandrel for forming the neck and flanges of the article movable sections, which inclose and protect the ball during the casting and form the cage around the same, so that bottle-stoppers and like articles of the class specified may be manufactured with great rapidity and perfection, and at reduced cost.

Heretofore, in the manufacture of the class of articles referred to, two general methods have been adopted, the first being to cast the neck with its flanges and the cage for inclosing the ball separately, and after inclosing the ball to finish the article by soldering the cage to the smaller flange of the neck, all of which involves much hand-labor of a skillful nature, requires time, and adds greatly to the cost of production. The second method consists in inclosing the ball in core material and forming a core therefrom, around which the cage is cast, the ball being subsequently released by breaking away the core material. This involves loss of time in preparing the core and in the subsequent removal of the core material, but is especially objectionable, in so far as it injures the appearance of the glass ball used and leaves the inside of the cage with the unfinished appearance incident to castings made on cores.

I will now proceed to describe my invention, so that others skilled in the art to which it appertains may apply the same.

In the drawing, A A' indicate the parts of a mold, the matrix thereof being a central cavity, $a$, corresponding to the neck of a bottle-stopper, and a recess, $b$, for forming one flange thereon, the second flange or bottom of the cage being formed by the groove $c$ and the sliding or movable sections of the mold. Below the groove $c$, and extending therefrom until they meet at the point $e$, are channels $d$, adapted to form the cage, said channels $d$ inclosing a portion of the mold $h$, hollowed out to receive the ball, and forming, with projections on the sliding or movable sections and with the mandrel, a cavity, which is closed at the time of casting. As the sizes of the glass balls used vary considerably, this cavity formed by the parts $h$ will be made sufficiently large to receive the largest size of ball ever used with bottle-stoppers.

$g$ indicates the sliding or movable sections, formed on their inner faces or ends to correspond with part $h$ of the main sections A A', and capable of being operated by levers pivoted on one of the main sections. In conjunction with the mold thus described is employed a mandrel, $m$, which projects through the cavity $a$, and in between the parts $h$, said mandrel forming the hollow neck in the casting, and occupying, during the pouring of the metal, the position shown in Fig. 2. In order to introduce the molten metal to the mold, a gate or pouring-orifice, $o$, is made in the main sections A A', as shown.

In employing the devices, a glass or equivalent ball, $i$, is placed in the cavity $h$. The movable sections $g$ are brought together to hold the same and the main sections A A' closed together, after which the mandrel $m$ is put in position, completely closing the ball-cavity. The metal, which is usually a white alloy, is melted and cast in the usual way, after which the sections $g$ may be withdrawn or moved back, the mold-sections A A' opened, and the casting taken out and removed from the mandrel; or, if preferred, the mandrel may be withdrawn before the sections A A' are opened.

The advantages of my invention are the rapidity and perfection with which the articles can be produced and the finished and uniform appearance of the article.

Having thus described the nature and advantages of my invention, what I claim, and desire to secure by Letters Patent, is—

The mold for forming bottle-stoppers and like articles, composed of the main sections, the supplemental or movable sections, and a mandrel, combined substantially as described, and adapted to inclose the ball and form the cage therefor, substantially as specified.

In testimony whereof I, the said HOMER WRIGHT, have hereunto set my hand.

HOMER WRIGHT.

Witnesses:
R. H. WHITTLESEY,
F. W. RITTER, Jr.